March 9, 1965 G. R. WELTI 3,173,139
RADAR SYSTEMS
Filed July 23, 1962 5 Sheets-Sheet 1

FIG 1

INVENTOR
GEORGE R. WELTI
BY Robert T. Dunn

March 9, 1965 G. R. WELTI 3,173,139
RADAR SYSTEMS
Filed July 23, 1962 5 Sheets-Sheet 2

INVENTOR
GEORGE R. WELTI
BY *Robert T Dunn*
AGENT

March 9, 1965 G. R. WELTI 3,173,139
RADAR SYSTEMS
Filed July 23, 1962 5 Sheets-Sheet 4

FIG 4

INVENTOR
GEORGE R. WELTI
BY Robert T. Dunn
AGENT

/ 
3,173,139
RADAR SYSTEMS
George R. Welti, Newton, Mass., assignor to Raytheon Company, Lexington, Mass., a corporation of Delaware
Filed July 23, 1962, Ser. No. 211,593
10 Claims. (Cl. 343—17.1)

This invention relates generally to systems in which received signals are applied to matched filters to thereby autocorrelate the received signals and improve the detection capability of the system. More particularly, the invention relates to an improved system wherein undesirable products of such autocorrelation are cancelled.

The detection capability of, for example, a radar system can be improved by increasing the time-bandwidth product of transmitted signals. This product is a figure of merit and considers both the range resolution or range accuracy of the system which is improved by increasing the spectro-bandwidth of the transmitted waveform and also considers the signal to noise ratio of received signals which can be increased by increasing the duration or duty cycle of the radar pulses.

Heretofore, the effective pulse period or time has been increased without reducing average transmitted power or without increasing transmitted peak power. This has been accomplished by the technique of pulse compression and has resulted in an increase in the time-bandwidth product. In pulse compression radar systems, a series of, for example, phase coded pulses are generated by applying a trigger signal to a filter network. These coded pulses are transmitted and their echoes are received. The received pulses are then applied to the same filter network producing an impulse representative of the target.

One pulse compression system, such as described in United States patent application Serial No. 25,775 filed April 29, 1960, by George R. Welti not only generates a phase coded series of pulses to thereby increase the duty cycle or the time factor in the time-bandwidth product, but also increases the bandwidth factor in the time-bandwidth product. This is accomplished by forming each transmitted pulse of a series of signals each containing a number of subpulses which vary in frequency. More particularly, the subpulses sequentially increase in frequency by fixed frequency increments and then decrease in frequency by the same increments forming a time versus frequency plot for each signal which appears as ascending and descending staircases. Thus, each transmitted pulse consists of a series of signals each containing the same number of subpulses divided into two groups, the first group forms the ascending steps, and the second group forms the descending steps. Each of the these signals is referred to as a "staircase." The autocorrelation function of each of the staircases is obtained by applying echo signals to the same filter networks which were employed to generate the staircases and consists of a central spike embedded in a noise background. This noise background can be reduced by optimum design of the stircase waveforms.

In the above-mentioned application the transmitted pulse is coded by phasing each of the staircase subpulses at zero or $\pi$. More particularly, in each staircase, the group of ascending subpulses are phase zero or $\pi$, and the group of descending subpulses are also phased zero or $\pi$. Accordingly, there are four states for each of the staircases; namely, each may include zero phased ascending and zero phased descending, or $\pi$ phased ascending and $\pi$ phased descending, or zero phased ascending and $\pi$ phased descending, or $\pi$ phased ascending and zero phased descending groups of subpulses. Accordingly, the pulse coding is sometimes referred to as quaternary. A second autocorrelation is made of this quaternary coded series of staircase signals which form the transmitted pulse to produce impulses representative of a target.

One difficulty in the above radar systems which employ autocorrelation techniques to increase the time factor in the time-bandwidth product to thereby increase detection capability is that the autocorrelation of the phase coded pulse of staircase signals normally produces not only a central impulse indicative of the target, but also produces additional impulses or hash impulses arranged symmetrically about the central impulse and which add an undesired ambiguity to the ouput of the system. It is one object of the present invention to provide an improved radar system wherein these additional undesired impulses which are sometimes referred to as hash are cancelled and do not appear in the output of the system.

In accordance with one feature of the present invention, sequential transmitted pulses are coded differently by, for example, impressing one phase-position code on odd numbered transmitted pulses and another phase-position code on even numbered pulses. The echoes of these coded pulses are then autocorrelated and alternate products of autocorrelation are reversed in phase so that by summing sequential products, the above-mentioned hash impulses cancel, whereas central impulses reinforce.

In accordance with one embodiment of the invention, an envelope or pulse of IF is applied to a four terminal filter network generating a phase-position coded sequential repetition of the envelope, the code being imposed as a zero or $\pi$ phasing of the IF. The coded pulse is transmitted, and reflections are received and fed to the same filter network. Switching circuits are provided at the input and output of the filter network so that sequential transmitted pulses are encoded differently and are decoded differently, and a phase inverting circuit is coupled to the network so that the phase of the central impulses produced by autocorrelation of sequential transmitted pulses are in the same phase, but the hash impulses are in opposite phase.

In accordance with one embodiment of the invention, a radar transmit and receive system such as described in United States patent application Serial No. 25,775 which includes an input filter and a canonic network, both of which are employed during both the transmit and receive intervals, is further equipped with a switching network between the input filter and canonic network and with another switching network, a phase inversion circuit and an integrating circuit coupled between the output of the canonic network and the radar display. A canonic network is a form of network which contains the minimum number of elements to meet a given requirement as defined in the text Introduction to Modern Network Syntheses by M. E. VanValkenburg, John Wylie & Sons, Copyright 1960, page 136. A specific form of canonic network and a mathematical definition thereof, which network is suitable as an element of the apparatus of the invention, is contained on page 407 of the IRE Transactions of the Professional Group on Information Theory, Volume IT–6, Number 3, June 1960, in the article entitled "Quaternary Codes for Pulsed Radar" by George R. Welti. The first-mentioned switching network is controlled by an alternate gating pulse generated in response to PRF trigger pulses, and the second mentioned switching network is controlled by gating pulses coincident with the transmit intervals of the system. As a result, the autocorrelated echo signals which are produced at the same repetition rate as the trigger pulses each include central impulses which are in the same phase, and these central impulses are each bracketed between minor hash impulses, the phase of the hash associated with adjacent sequential central impulses being in opposite phase. Accordingly, the autocorrelated signals when applied to the integration circuit which has a time constant equal to the interval between trigger pulses results in the reinforcement of central impulses and cancellation of the hash impulses.

In accordance with another embodiment of the invention, a canonic network such as described in the above-mentioned United States patent application is employed but without the input filter described in the application. In this embodiment, pulses of IF are applied to the canonic network through switching circuits which are synchronized with the PRF of the system. Different outputs of the canonic network are coupled to an antenna and to a display, and this coupling includes a phase reversing circuit and a second switching network synchronized with the PRF of the system and an integration circuit having a time constant equal to the interval of the PRF. The first and second mentioned switching circuits are constructed and controlled so that the pulses of IF, which are each produced in response to a transmit trigger pulse, when fed to the canonic network during the transmit interval each produce a grouping of similar pulses which are coded by the phase of the IF. This phase coded group is mixed to produce RF and transmitted. Echoes are received during a receive interval, mixed with local oscillator frequency to produce the IF, and fed to the canonic network through the first-mentioned switching circuit wherein the echoes are autocorrelated. As a result, each of the autocorrelated groups includes a central impulse bracketed within minor impulses of hash. The phase of adjacent central impulses is the same, whereas the phase of the corresponding hash associated with subsequent central impulses is opposite. These autocorrelated echo signals are then applied to a delay line type integrating circuit including a delay line having an interval equal to the interval between transmit trigger pulses. The integrating circuit serves to add subsequent central impulses because they are in phase, but cancels the hash impulses which are out of phase. The added central impulse signals are then applied to a display circuit to indicate the presence of a target.

Other features and objects of the present invention will be more apparent from the following specific descriptions taken in conjunction with the drawings in which.

Figure 1:
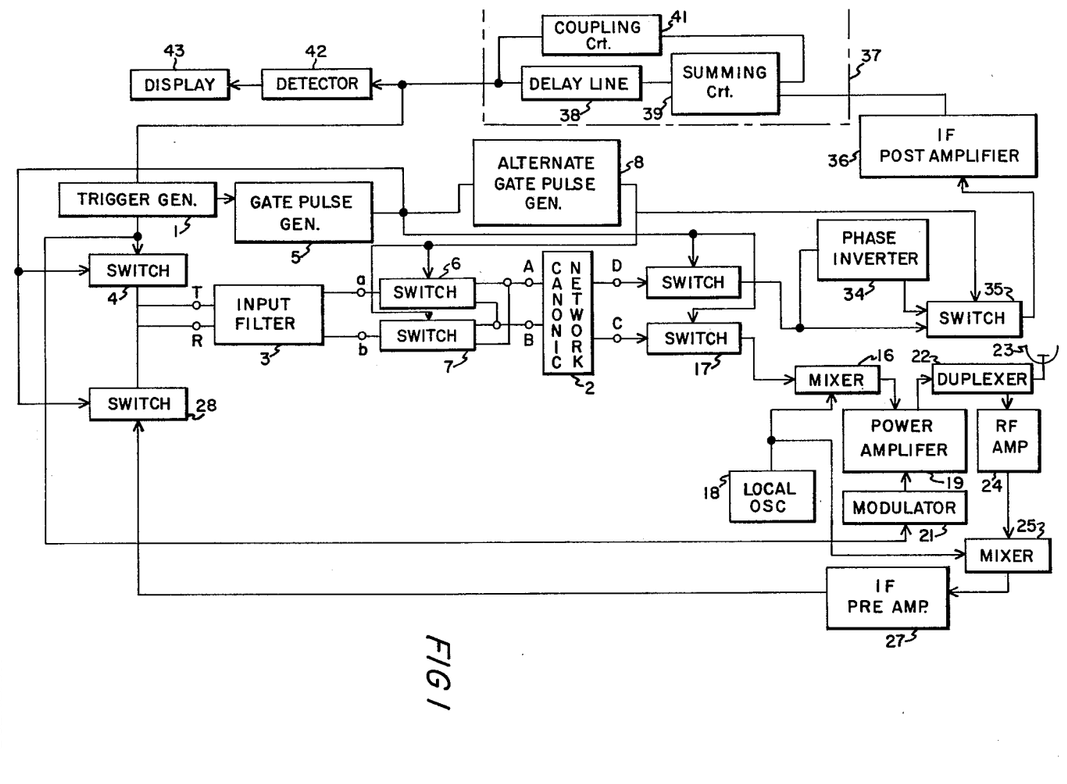
FIG. 1 is a block diagram of a transmit-receive radar system similar to that described in the above-mentioned United States patent application and including additional switching and phase reversing circuitry and an integration circuit at the input to the display whereby hash impulses in the autocorrelation products from the canonic network are cancelled.

Turning first to FIG. 1 there is shown a block diagram of a system very similar to that shown in FIG. 1 of the above-mentioned United States patent application which transmits a pulse consisting of a series of ascending and descending staircases of subpulses in response to each PRF trigger pulse. Accordingly, in response to each trigger pulse in the output of trigger generator 1 the system produces a train of staircase signals each consisting of subpulses ascending and descending in frequency in a repetitive manner. The number of staircase signals is determined by the number of units in a canonic network 2, and the number of subpulses in each ascent and each descent is determined by the number of units in an input filter 3. The operation of the circuit is very similar to that described in considerable detail in the above-mentioned application. Furthermore, the canonic network 2 and input filter 3 are preferably constructed substantially the same as canonic network 11 and input filter 10 in FIG. 1 of the above-mentioned application with the exception that the canonic network 2 described in embodiments of the present invention, for the sake of simplicity, includes fewer units than the canonic network described with relation to FIG. 1 in the above-mentioned application. More particularly, the canonic network in the mentioned application includes four binary weighted delay units, whereas in the present application it includes only three. Furthermore, the trigger generator in the present invention is controlled by the output of a delay line type integration circuit which effectively synchronizes the period between trigger pulses so that the period is equal to the interval of the delay line. This is preferred as will be seen from further explanation hereinbelow.

Figure 2A:
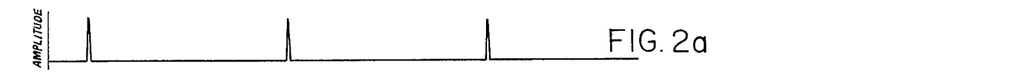
FIGS. 2a–2n illustrate waveforms of transmitted signals, autocorrelation products, and gating signals to aid in understanding of the operation of the system shown in FIG. 1.

In operation, triggers from trigger generator 1 such as shown in FIG. 2a are applied via a switch 4 to one input of the input filter 3 just as also shown in FIG. 1 of the above-mentioned application. Trigger pulses are also applied to a gate pulse generator 5 which produces pulses defining the transmit and receive intervals such as illustrated by the waveform in FIG. 2c. These gating pulses control switch 4 so that during the transmit interval the switch applies the trigger pulses from generator 1 to the input T of the input filter 3. Input T corresponds to the output of diode gate 50 in FIG. 3a of the above-identified application.

In response to the triggers from trigger generator 1, the two parts of a staircase signal are produced from input filter 3, one at terminal $a$ and one at terminal $b$ of the filter. The signal at terminal $a$ is best represented by a plot of frequency versus time and, as such, appears as an ascending staircase, while a similar plot of the waveform at terminal $b$ appears as a descending staircase commencing in time at the end of the ascending staircase.

Figure 2B:
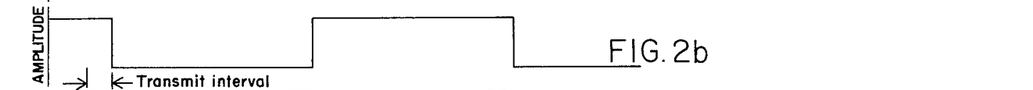

The signals at $a$ and $b$ of the input filter 3 are applied to similar switches 6 and 7 which are controlled in an identical manner by the output of alternate gate pulse generator 8 which produces a signal such as shown in FIG. 2b in response to the output of gate pulse generator 5. The switches 6 and 7 respond to this waveform so that the switches are always in the same one position during alternate transmit intervals and are always in the same opposite position during the alternate receive intervals. More particularly, if the transmit intervals are successively numbered integral numbers and corresponding receive intervals have the same numbers, then during odd transmit intervals signals appearing at terminal $a$ in the output of filter 3 will be applied to terminal A of canonic network 2, and signals appearing in terminal $b$ of the output of filter 3 will appear at terminal B of the canonic network 2. Furthermore, during odd numbered receive intervals signals appearing in terminal $a$ of input filter 3 will appear at terminal B of the canonic network, and signals appearing at terminal $b$ of the input filter will appear at terminal A of the canonic network. During even numbered transmit intervals, however, the reverse occurs and signals appearing in terminals $a$ and $b$ of input filter 3 appear in terminals B and A, respectively, of canonic network 2, whereas during even numbered receive intervals signals appearing in terminals $a$ and $b$ of input filter 3 appear at terminals A and B, respectively, of canonic network 2.

For purposes of clarity, a group of subpulses which form the ascending part of a staircase signal will be denoted $\alpha$ and a group of subpulses which form the descending part will be denoted $\beta$. Accordingly, during an odd numbered transmit interval, an $\alpha$ group appears at terminal A of the canonic network 2, and a β group appears at terminal B of the canonic network. These two groups are then combined and phase coded in accordance with inherent characteristics of the canonic network, and as a result, there appears at the output C of canonic network 2 a series of α and β groups of subpulses which are phase coded in accordance with the characteristics of the canonic network. That is to say each subpulse which forms, for example, an α group will be phased at either zero or π denoted herein as plus (+) or minus (−). Accordingly, a plot of frequency versus time of the waveform at terminal C during an odd numbered transmit interval appears as illustrated in FIG. 2d. Adjacent subpulses which form each of the α and β groups shown in FIG. 2d are quite obviously at different frequencies. However, these frequencies are all generally referred to as IF to thereby distinguish from the transmitted or RF.

Figure 3:
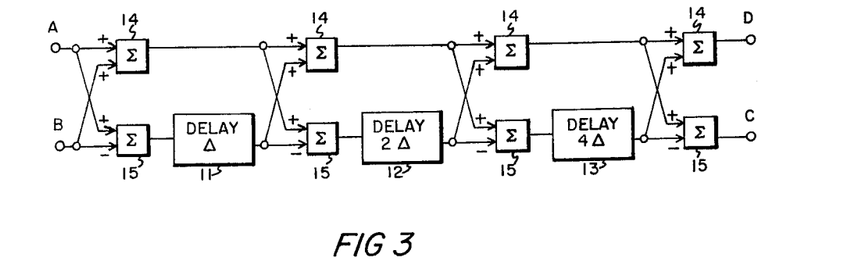
FIG. 3 illustrates a block diagram of a typical canonic network including three delay elements and which is constructed and operates substantially as described in considerable detail in the above-mentioned United States patent application.

It will be noted that eight pairs of α and β ascending and descending groups form eight staircase signals appearing at terminal C, whereas only a single pair were introduced at terminals A and B of the canonic network. The reason for this can be readily illustrated by reference to a block diagram of the canonic network shown in FIG. 3 illustrating the four terminals of the canonic network, namely input terminals A and B and output terminals C and D with summing circuits coupled as shown with binary weighted delays 11, 12 and 13 between the upper and lower summing circuits 14 and 15, respectively. If, for example, a signal at plus (+) phase is introduced at terminal A, it will appear at terminal C with substantially zero delay. It will also appear at terminal C seven additional times, each delayed by sequential integral numbers of the Δ delay units at relative phases shown below.

Zero Delay  +
1Δ Delay    +
2Δ Delay    +
3Δ Delay    −
4Δ Delay    −
5Δ Delay    −
6Δ Delay    +
7Δ Delay    −

From the above it can be seen that a phasing code is imposed upon any signal introduced at either terminal A or terminal B and series of the signals appearing at terminal C or terminal D can be set forth in terms of a sequential arrangement of plus (+) and minus (−). The phasing codes between pairs of terminals are as follows:

A–C  +++−−−+−
A–D  +++−++−+
B–C  +−++−+++
B–D  +−+++−−−

In view of the above, it should be clear that the time versus frequency plot of the signal at terminal C during odd numbered transmit intervals is as shown in FIG. 2d, and during even numbered transmit intervals is at shown in FIG. 2e. In these figures, the α and β groups are indicated, and the phase coding of each of the groups is indicated by a plus (+) or minus (−). If, for example, an α group is phase coded +, this means that a given frequency subpulse in that group is in the same phase as the same given frequency subpulse in another α group displaced therefrom in time by an integral number of intervals between trigger pulses. These are the intervals between pulses in FIG. 2a.

Figure 2C:
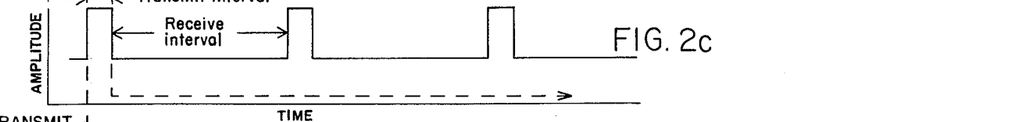
Figures 2D, 2E:
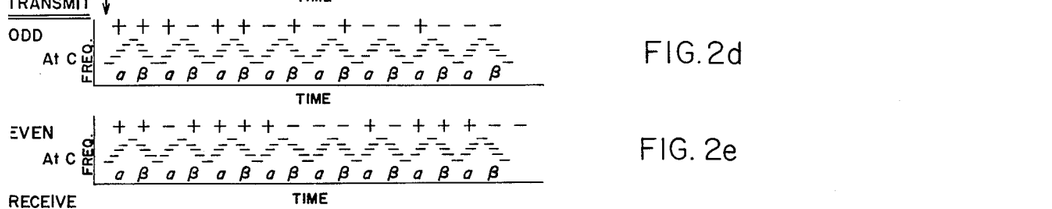

The composite pulse at terminal C of the canonic network is fed to a mixer 16 via a switch 17, the switch 17 being controlled by the gate pulses illustrated in waveform FIG. 2c so that terminal C is coupled to mixer 16 only during the transmit interval. Mixer 16 serves to mix the IF with local oscillator frequency from the local oscillator 18 producing a pulse of RF which is fed to a power amplifier 19. The power gain of amplifier 19 is controlled by the output of a modulator 21 which is in turn controlled by pulses from trigger generator 1. As a result, the modulator applies operating power to the power amplifier only during the duration of the pulse appearing at terminal C of the canonic network which is substantially the transmit interval. The amplified pulse is applied to a conventional duplexer 22 and from there to antenna 23.

An echo of the transmitted pulse is detected by the antenna 23 and coupled through the duplexer 22 to RF amplifier 24 in the well-known manner of a duplexer. The output of the amplifier 24 is fed to a mixer 25 wherein the RF echo is mixed with the output of local oscillator 18 producing IF equal to those generated in the input filter during the transmit interval. The IF from mixer 25 is fed to IF preamplifier 27, and the output of the preamplifier is coupled to terminal R of input filter 3 via a switch 28. Terminal R of input filter 3 is the same as the output of diode gate 201 shown in FIG. 3a of the above-mentioned United States patent application, and switch 28 serves the same function as diode gate 201.

The various filter circuits which make up input filter 3 and which were triggered by pulses from trigger generator 1 to generate the subpulses which form the α and β staircase groups are closely matched in response to the received waveform. Accordingly, the individual α and β groups of subpulses when applied to terminal R of the input filter during the receive interval are each autocorrelated, and the autocorrelation products appear in the output terminals a and b of the filter during the receive interval. The construction of input filter 3 is such that the autocorrelation products of the α group of subpulses appear in output terminal b of input filter 3, and the autocorrelation products of β groups of subpulses appear in terminal a of input filter 3, which is somewhat the reverse of what happens during the transmit interval.

Figures 2F, 2G:
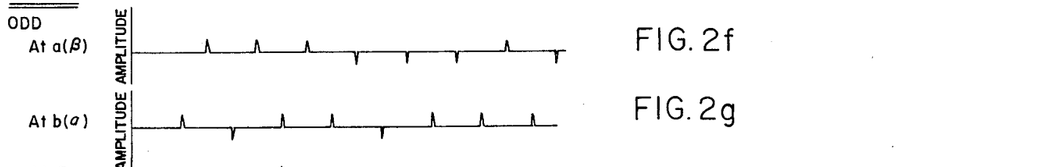

During odd numbered receive intervals, the autocorrelation products of β groups appear at terminal a of the input filter and can be represented by spikes as shown in FIG. 2f. In FIG. 2f the autocorrelation product of each single β group is represented by a spike projecting above or below a base line depending depending on whether the impulse is at plus or minus phase, respectively. Accompanying these impulses there is, of course, some noise or hash such as shown in FIGS. 8w and 8x of the above-identified patent application and discussed in considerable length therein. This type of hash is not discussed in the present application because it is not the purpose of the present invention to cope with it. Correspondingly, at terminal b during the odd numbered received intervals, the correlation products of α groups of subpulses will also consist of a series of impulses, the phase of each being as indicated by the spikes shown in FIG. 2g. During even numbered receive intervals, on the other hand (which follow even numbered transmit intervals, when the switches 6 and 7 were both in a different position than during odd numbered transmit intervals), autocorrelation products of α groups appear at terminal a of the input filter, and autocorrelation products of β groups appear at terminal b as shown in FIGS. 2k and 2l, respectively. Thus, it can be seen that the same type of autocorrelation products appear at terminal a during odd numbered receive intervals as appear at terminal b during even numbered receive intervals, and, furthermore, the same sort of autocorrelation products appear at terminal b during odd numbered receive intervals as appears at terminal a during even numbered receive intervals.

The phase coding and delay characteristics of the canonic network 2 are matched to the received echo signal with respect to the phase coding of the staircase signals. The canonic network is not matched in a frequency sense; it is matched with respect to the position and phase of impulses which are fed to it. Accordingly, the canonic network is matched to the autocorrelation products of the α and β groups of subpulses and, if the impulses at the terminals a and b are fed to the proper terminals A or B of the canonic network 2, the autocorrelation products of these impulses will appear at terminal D of the canonic network. In short, the products of the second of two autocorrelation processes will appear at terminal D. The alternate gating signal shown in FIG. 2b which controls the switches 6 and 7 is designed to couple the outputs of the input filter 3 to the canonic network during both odd and even numbered receive intervals so that the autocorrelation products of the impulses appear at terminal D. Furthermore, these autocorrelation products at terminal D are such that by merely inverting phase of such products received during alternate receive intervals, the products received during subsequent intervals can be added in an integrating circuit, and the central impulses will reinforce, whereas undesired hash impulses will cancel.

Figure 2H:
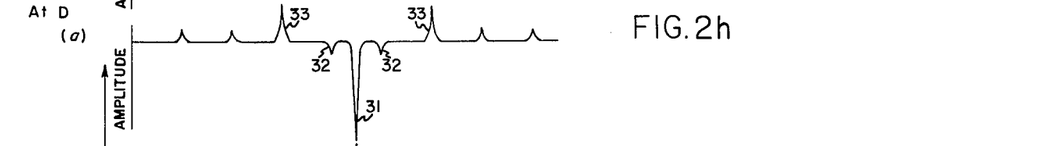
Figure 2J:
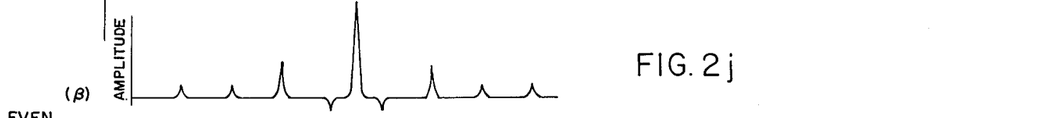
Figure 2K:
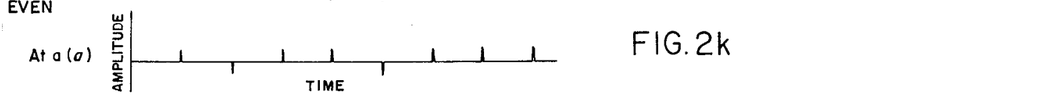
Figures 2L, 2M:
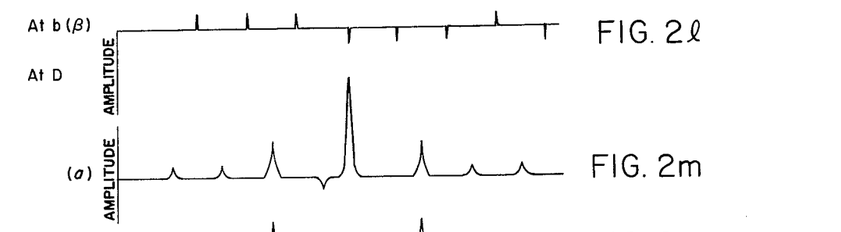

In order to illustrate the above operation, consider the waveforms shown in FIGS. 2h, 2j, 2m and 2n. These illustrate the above-mentioned second autocorrelation products of α and β type groups at terminal D of the canonic network during odd and even numbered receive intervals. During the odd intervals, the α group product from the canonic network appears as represented in FIG. 2h which shows the relative position and phase of these products. They include a central impulse 31 positioned with minor hash impulses disposed symmetrically on either side thereof. These products result during an odd numbered receive interval when a phase-position coded signal which was originally generated by encoding an α group from terminals A–C is decoded from terminals B–D. More particularly, the position-phase code from A–C, as already mentioned above, is $$+\ +\ +\ -\ -\ -\ +\ -$$

During the odd number receive interval, this A–C coded signal is autocorrelated between terminals B–D of the canonic network, and the position-phase coding from terminals B–D is $+\ -\ +\ +\ +\ -\ -\ -$. The autocorrelation products can be determined as follows:

```
          A-C  ———>                      B-D
  + + + - - - + -
  - - - + + + - +
    + + + - - - + -
      + + + - - - + -
        + + + - - - + -
          - - - + + + - +
            - - - + + + - +
              - - - + + + - +
 ───────────────────────────────
  +1  +1  +3  -1 -8 -1  +3  +1  +1
```

From the above it is clear that the central impulse 31 has an amplitude of eight units and is in negative phase; the immediately adjacent hash spikes impulses 32 have an amplitude of one, and are also in negative phase; the next two adjacent hash impulses 33 have an amplitude of three and are in positive phase; the next adjacent hash impulses have amplitudes of one and are in positive phase, and etc. Similarly, the position-phase autocorrelation of the β type autocorrelation products which appear during odd numbered receive intervals at terminal a of the input filter produce impulses at terminal D having amplitude, position and phase relationships as indicated in FIG. 2j. This can be demonstrated by autocorrelating a B–C code which is $+\ -\ +\ +\ -\ +\ +\ +$ with an A–D code which is $+\ +\ +\ -\ +\ +\ -\ +$, as shown below:

```
          B-C  ———>                      A-D
  + - + + - + + +
    + - + + - + + +
      + - + + - + + +
        - + - - + - - -
          + - + + - + + +
            + - + + - + + +
              - + - - + - - -
                + - + + - + + +
 ───────────────────────────────
  +1  +1  +3  -1 +8 -1  +3  +1  +1
```

During the even numbered receive intervals the position phase relationship of impulses appearing at terminal a of the input filter which are the autocorrelation products of α type groups are as illustrated in FIG. 2k. At the same time, the autocorrelation products of β type groups appear at terminal b as indicated in FIG. 2l. During the even numbered receive intervals, the signal from alternate gate generator 8 shown in FIG. 2b operates the switches 6 and 7 so that terminal a of the input filter couples to terminal B of the canonic network, and terminal b of the input filter couples to terminal A of the canonic network. Accordingly, the α type correlation products at terminal a of the input filter which were position-phase coded B–C or $+\ -\ +\ +\ -\ +\ +\ +$ during an even numbered transmit interval are autocorrelated from terminal A to terminal D. The code A–D is $+\ +\ +\ -\ +\ +\ -\ +$, and so the products at terminal D are determined as below:

```
          B-C  ———>                      A-D
  + - + + - + + +
    + - + + - + + +
      + - + + - + + +
        - + - - + - - -
          + - + + - + + +
            + - + + - + + +
              - + - - + - - -
                + - + + - + + +
 ───────────────────────────────
  +1  +1  +3  -1 +8 -1  +3  +1  +1
```

Similarly, the β autocorrelation products at terminal b during the even numbered receive intervals encoded during an even numbered transmit interval are position-phase coded A–C or $+\ +\ +\ -\ -\ -\ +\ -$. This signal is applied to terminal B of the canonic network and, therefore, position-phase correlated from B–D so that the double correlation products at terminal D are determined as follows:

```
          A-C  ———>                      B-D
  + + + - - - + -
  - - - + + + - +
    + + + - - - + -
      + + + - - - + -
        + + + - - - + -
          - - - + + + - +
            - - - + + + - +
              - - - + + + - +
 ───────────────────────────────
  +1  +1  +3  -1 -8 -1  +3  +1  +1
```

Figure 2N:
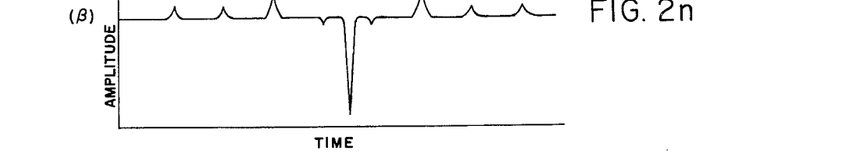

Accordingly, at terminal D during the even numbered receive intervals, the double autocorrelation products of the α type groups is as indicated in FIG. 2m and of β type groups as indicated in FIG. 2n.

The next step is to combine the signals appearing at terminal D so that the central autocorrelation impulses such as 31 of the same frequency add in phase and so that the hash impulses such as 32 and 33 of the same frequency cancel in phase. This is accomplished by reversing the phase of the autocorrelation products during either the even numbered or during the odd numbered receive intervals, then delaying all the correlation products by an integral number of intervals between trigger pulses. These are the intervals between pulses shown in FIG. 2a. For this purpose a phase inversion circuit 34 is coupled between the output of terminal D of the canonic network, and a switch 35 which is controlled by the alternate gate pulses shown in FIG. 2b. Switch 35 is controlled by the alternate gate pulses shown in FIG. 2b and serves to feed phase-reversed α and β correlation products during alternate receive intervals to amplifier 36 so that the hash impulses of such products produced during adjacent receive intervals are in opposite phase and will cancel when superimposed in time. The correlation products are amplified by amplifier 36 and applied to a delay type integrating circuit 37. The circuit includes a delay line 38 and a summing input circuit 39 with a closed loop 41 from the output of the delay line to the input of the summing circuit. The circuit serves to delay all of the products of autocorrelation by the interval of the delay line and also establishes the period between trigger pulses from trigger generator 1 so that the period between such pulses is equal to the interval of the delay line.

In operation, each of the autocorrelation products such as illustrated in FIGS. 2h, 2j, 2m and 2n with the products received during odd or even receive intervals appropriately switched in phase as mentioned above, are applied to the summing circuit 39 which in turn applies these products to one end of the delay line 38. The output of delay line 38 is coupled back by coupling 41 to the input of the summing circuit 39 and added to the next received products from the post amplifier. The feedback coupling 41, however, couples a predetermined fraction of the signal at the end of the delay line, and each correlation product fed to the summing circuit from the post amplifier continues to circulate in the loop, including the delay line 38, feedback coupling 41, and summing circuit 39, but decreases in magnitude with each cycle of circulation. As a result, the output of the delay line includes $\alpha$ impulses, each of which is the sum of series of central $\alpha$ correlation impulses all of which are in the same phase and of decreasing magnitude. Likewise, the $\beta$ impulses appearing in the output of the delay line are each summations of a series of $\beta$ central correlation impulses all of the same phase and of decreasing magnitude. The autocorrelation hash impulses, such as 32 and 33 of both $\alpha$ and $\beta$ autocorrelation products cancel in summing circuit 39 and do not appear in the output of the delay line. The output of the delay line may be utilized by applying it to a detector 42 which energizes a display 43 which may be a PPI scope, and as mentioned above, this output also triggers trigger generator 1 to establish the interval between transmit trigger pulses from the trigger generator.

Figure 4:
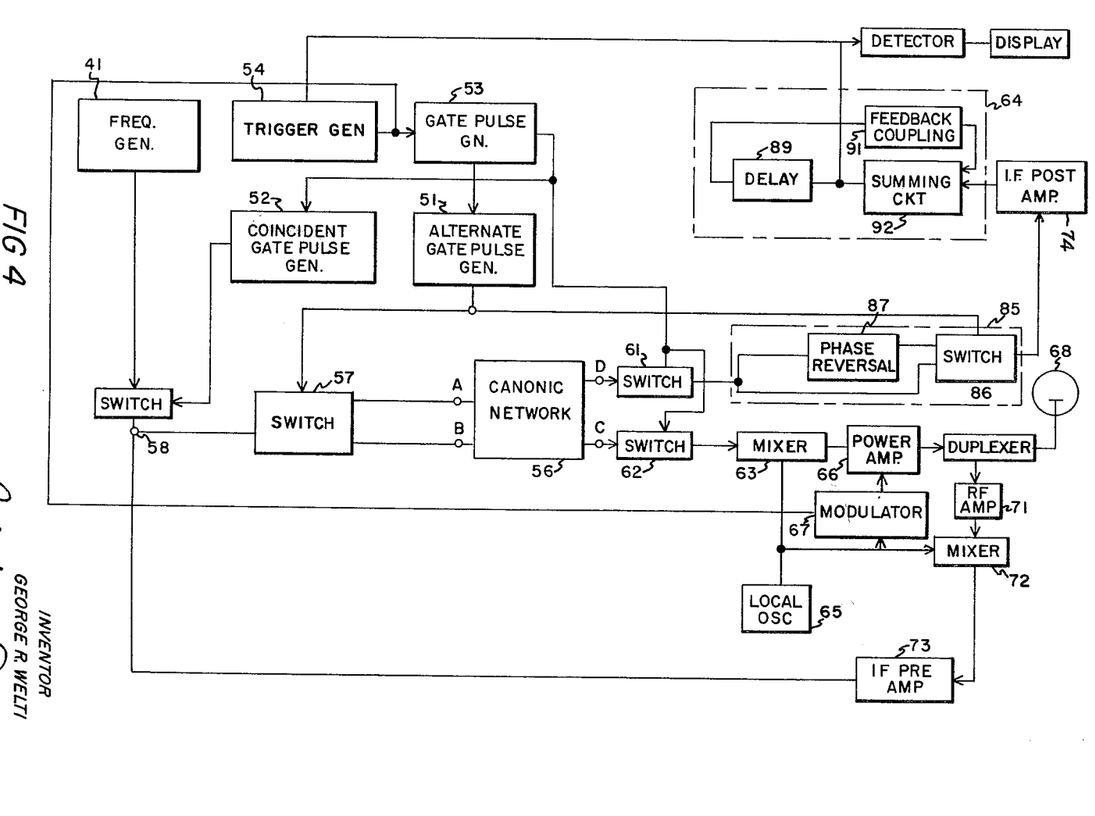
FIG. 4 is a block diagram of a transmit-receive radar system wherein the time-bandwidth product figure of merit is increased primarily by increasing the period of transmitted pulses and wherein autocorrelation hash is cancelled.
Figures 5A, 5B:
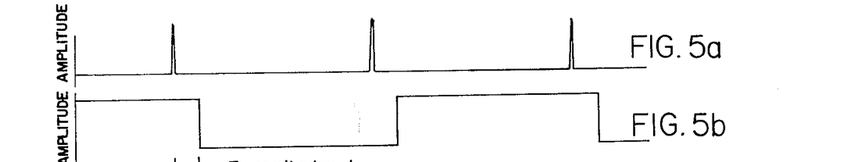
FIGS. 5a–5g illustrate waveforms of transmitted signals, autocorrelation products and gating signals to aid in understanding operation of the system shown in FIG. 4.
Figure 5C:
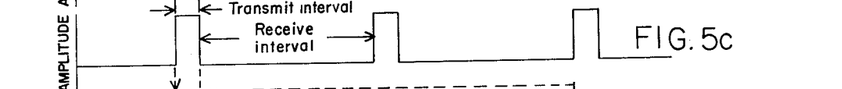
Figure 5D:
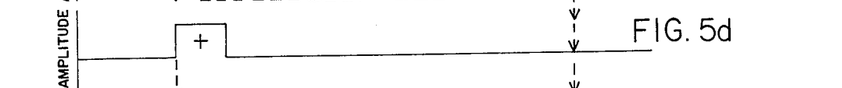

Turning next to FIG. 4 there is shown a block diagram of a transmit-receive radar system for transmitting pulses generated in the canonic network such as shown in FIG. 3 and for receiving echoes of the transmitted signal, selectively phase reversing some and feeding them to the same canonic network wherein the received echoes are autocorrelated. The autocorrelated signals are applied to a delay type integrating circuit for cancelling hash and producing an autocorrelation spike or impulse representative of a target for energizing a display. Waveform diagrams which assist to understand the operation of the system in FIG. 4 are illustrated in FIGS. 5a–5g. As shown in FIG. 4, an IF signal from generator 51 is gated by pulses from coincident gate pulse generator 52 which are initiated by signals from gate pulse generator 53 controlled by triggers from trigger generator 54 which determine the PRF of the system. This gating is accomplished by switch 55 producing a short pulse of IF from the switch during the transmit interval illustrated in FIG. 5c. FIG. 5d illustrates the envelope of this pulse which is, for convenience, denoted as being in positive (+) phase. It should be noted that the coincident gate pulses which control switch 55 are coincident with the transmit interval but are of a shorter duration. This is required because the waveform shown in FIG. 5d is expanded in the canonic network, but as expanded should not exceed the transmit interval.

The waveform shown in FIG. 5d which appears at the output of switch 55 is applied to terminals A or B of the canonic network 56 via another switch 57. Switch 57 is controlled by the pulses shown in FIG. 5b generated in alternate gate pulse generator 51 in response to pulses from gate pulse generator 53 shown in FIG. 5c. Generator 51 might, for example, include a differentiating circuit and a single input two-stage flip-flop circuit responsive to negative going spikes from the differentiating circuit which represent the back end of the pulses shown in FIG. 5c.

Figure 5E:
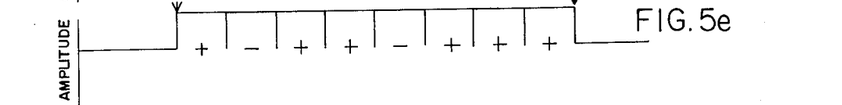

The purpose of switch 57 is to feed the signal at terminal 58 to input A of the canonic network during odd numbered transmit intervals and to terminal B during odd numbered receive intervals and to terminal B during even numbered transmit intervals and terminal A during even numbered receive intervals. The reason for this is apparent in view of the position-phase coding characteristics of the canonic network which are described above. During even numbered transmit intervals, when terminal 58 is coupled to terminal B, the pulse will appear at terminal C of the canonic network expanded to the form shown in FIG. 5e and coded + − + + − + + + which, as shown above, is the code from terminals A–C of the canonic network. Since there are, for purposes of example, three binary weighted delay units in the canonic network, the pulse will give rise to a string of eight phase coded pulses such as illustrated by the waveform of FIG. 5e at terminal C. The unit delay $\Delta$ in the canonic network is preferably equal to or greater than the interval of the pulse from switch 55, and so the total interval of the pulse at terminal C during a transmit interval is preferably at least eight times the interval of the signal introduced at terminals A or B during the transmit interval.

Switches 61 and 62 are controlled by gate pulses from generator 53 and couple terminal C to a mixer 63 during the transmit intervals and terminal D to an integrating circuit 64 during receive intervals. During the transmit intervals the coded pulse of IF from terminal C is mixed in mixer 63 with local oscillator frequency from local oscillator 65 to produce a similarly coded pulse of RF. The pulse of RF is fed to power amplifier 66 which is energized during only the transmit intervals by means of gain control modulator 67 responsive to trigger pulses from trigger generator 54. The output of power amplifier 66 is fed to antenna 68 through a duplexer 69.

Figure 5F:
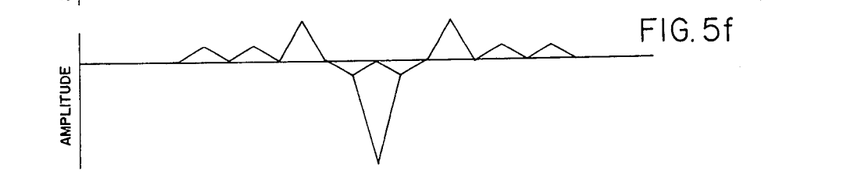
Figure 5G:
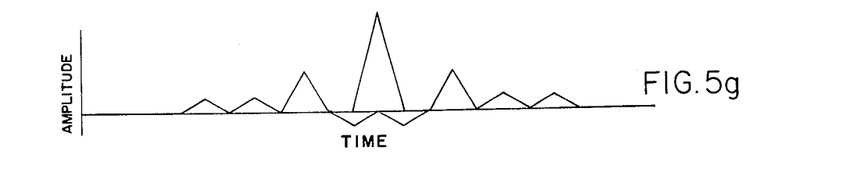

During receive intervals, echoes of transmitted pulses picked up by the antenna 68 are coupled through the duplexer to RF amplifier 71, and from there to mixer 72 wherein they are mixed with local oscillator frequency from oscillator 65 again producing envelopes of IF which are amplified in IF preamplifier 73 and fed to junction 58. During receive intervals switch 55 is closed, and, as mentioned above, during odd receive intervals, switch 57 couples the signal at terminal 58 to input terminal B of the canonic network, and during even numbered receive intervals to input terminal A of the canonic network. The network serves to autocorrelate these signals, and the products of autocorrelation appear at terminal D. During the odd numbered receive intervals, the correlation products will be an envelope of IF including peaks of relative amplitude phase and position as illustrated in FIG. 5f. During even numbered receive intervals the signal envelope at C is as illustrated in FIG. 5g. During all receive intervals, switch 61 couples terminal D to IF post amplifier 84 via a phase determining circuit 85. The circuit includes a switch 86 and phase reversal 87 controlled by the alternate gate pulses shown in FIG. 5b so that the trains of waveforms received during sequential receive intervals include central impulses which are in the same phase but include hash impulses which are in opposite phase just as already described above with reference to FIG. 1 and FIGS. 2h and 2m.

The output of IF post amplifier 84 is integrated by integration circuit 64 including a delay line 89, feedback coupling 91 and summing circuit 92. The interval of the delay line 89 is preferably equal to the interval between trigger pulses from trigger generator 54 so that corresponding correlation products of consecutive received intervals combine in the summing circuit reinforcing central impulses and cancelling hash impulses, producing at the output of the summing circuit envelopes of IF suitable for energizing a display. These envelopes are applied to a detector 97 which energizes a display 98 which may be, for example, a PPI display.

This concludes descriptions of a few embodiments of the present invention, each related to a transmit-receive radar system in which signals are encoded at least with respect to position and phase, and transmitted. Echoes of the transmitted signals are fed to the same encoding circuits through suitable switching networks controlled in a predetermined manner so that the desired products of autocorrelation bear one phase relationship, whereas undesired products bear another phase relationship and may

What is claimed is:

1. A signal system comprising:
means for generating successive trains of encoded signals of which different alternate groups of trains are encoded differently;
means for transmitting said successive trains of signals;
means for receiving and autocorrelating said transmitted signals;
and means coupled to an output of said autocorrelating means for cancelling some autocorrelation products of successive trains and for retaining other products.

2. A signal system comprising:
means for generating successive trains of encoded signals of which different alternate groups of said trains are encoded differently;
means for transmitting said encoded trains of signals;
means for receiving and autocorrelating each of said successive trains of signals;
and delaying and adding means coupled to said autocorrelating means for cancelling some selected products of said autocorrelation and for retaining other products.

3. A signal system comprising:
means for generating successive trains of encoded signals of which adjacent trains are encoded differently;
means for transmitting said encoded trains;
means for receiving and autocorrelating each of said successive trains;
and integrating means coupled to said autocorrelating means for cancelling undesired products of said autocorrelation while retaining desired products.

4. A system for transmitting a signal generated in a filter network and for receiving echoes of said signals and autocorrelating them in the same filter network comprising:
means generating an envelope of signals;
a filter network;
switching means coupling said generating means to said filter network;
transmitting means coupled to an output of said network;
means for receiving echo signals of said generated envelope of signals;
means coupling said receiver means to said filter network;
means coupled to the output of said filter means for delaying and adding successive received echo signals;
gating means coupling said generating and receiving means to said filter network;
and phase reversing means coupling said filter network to said delaying and adding means responsive to signals synchronized with the initiation of said envelope whereby some autocorrelation products from said filter network are reinforced in said adding circuit and other products cancel.

5. A system for transmitting a signal generated in a filter network and for receiving echoes of said signals and autocorrelating them in the same filter network comprising:
means generating an envelope of signals;
a filter network;
switching means coupling said generating means to said filter network;
transmitting means coupled to an output of said network;
means for receiving said echo signals;
means coupling said receiver means to said filter network;
integrating means responsive to the output of said filter network;
gating means coupling said generating and receiving means to said filter network;
phase reversing means coupling said filter network to said integrating means;
and means generating signals synchronized with the initiation of said envelope for controlling said gating and phase reversing whereby some of the autocorrelation products from said filter network are reinforced in said integrating circuit and other products cancel.

6. In a system for generating and transmitting signals and receiving and autocorrelating said signals;
means for retaining desired products of said autocorrelation while cancelling undesired products comprising:
means periodically producing initiating signals;
filter means responsive to each initiating signal including at least means for inverting and delaying to produce an encoded train of signals;
means for transmitting said encoded trains;
receiving means responsive to said transmitted encoded trains;
means coupling the output of said receiver means to said filter means;
means integrating an output of said filter means;
and gating circuits associated with said filter means and synchronized with said initiating signal whereby desired products of said autocorrelation of said trains of signals are retained in said integrating means, whereas undesired products are cancelled.

7. In a system for generating and transmitting signals and receiving and autocorrelating said signals;
means for retaining desired products of said autocorrelation while cancelling undesired products comprising:
means periodically producing initiating signals;
filter means responsive to each initiating signal including at least means for inverting and delaying to produce an encoded train of signals;
means for transmitting said encoded trains;
receiving means responsive to said transmitted encoded trains;
switching means coupling the output of said receiver means to said filter means;
means for integrating an output of said filter means;
second switching means and phase inverting means coupling said filter output to said integrating means;
and means producing signals synchronized with said initiating signal for controlling said switching means whereby selected products of autocorrelation in the output of said filter means are reinforced in said integrating means, whereas other products are cancelled.

8. A signal system comprising:
means for generating successive pulses of electrical energy;
means for progressively deriving from each of said pulses symmetrically varying frequencies;
means for progressively determining sequences of said frequencies to provide a coded series of signals, the code of adjacent series being different;
means for applying said successive coded series of signals to said means for determining sequences to successively decode each of said series;
and means for delaying and adding said successively decoded series whereby desired products of said decoding are retained, whereas undesired products are cancelled.

9. A signal system comprising:
means for generating successive pulses of electrical energy;
means for progressively deriving from each of said pulses symmetrically varying frequencies;
means for progressively determining sequences of said frequencies to provide a coded series of signals, the code of different groups of alternate successive series being different;

means for applying said successive coded series of signals to said means for determining sequences to successively decode each of said series;

means for reversing phase of one of said groups of alternate decoded series;

and means delaying and adding said decoded successive series whereby desired products of said decoding are retained, and undesired products cancelled.

10. A signal system comprising:

means for generating spaced pulses of electrical energy;

means for progressively deriving from each of said pulses a symmetrically varying sequence of frequencies;

means for progressively determining sequences of said frequencies to provide a coded series of signals in response to each of said spaced pulses, the code of adjacent sequential series being different;

means for applying said successive coded series of signals to said means for determining sequences to successively produce signals representing the autocorrelation function of each of said coded series;

means for reversing phase of selected of said signals representing autocorrelation functions;

and means delaying and adding successive of said signals representing autocorrelation functions to cancel undesired products of said autocorrelation.

No references cited.

CHESTER L. JUSTUS, *Primary Examiner.*

KATHLEEN CLAFFY, *Examiner.*